Oct. 5, 1954
D. PERLMAN ET AL
2,691,011
RECOVERY OF STEROL GLYCOSIDES AND INOSITOL
Filed Oct. 26, 1950
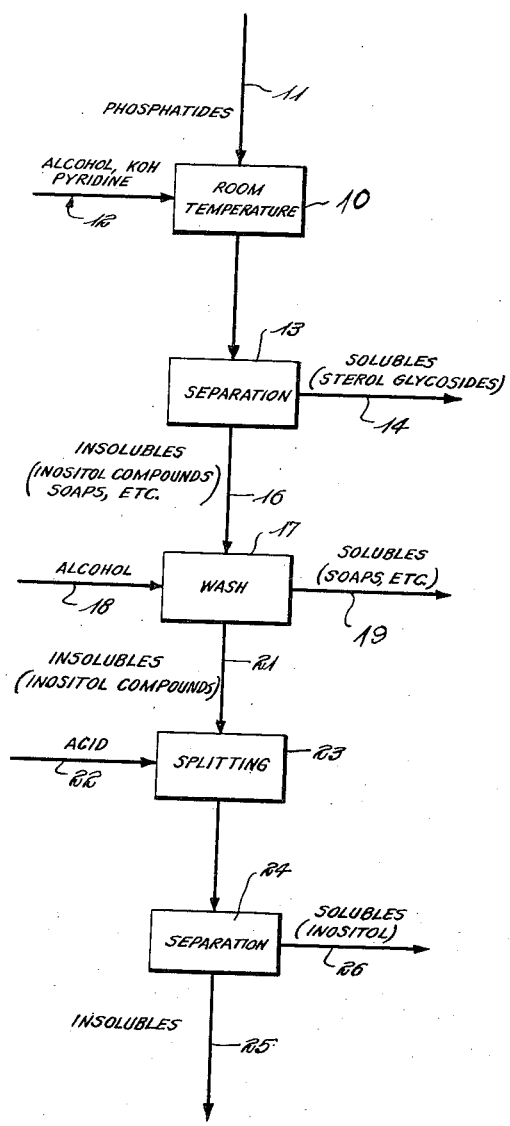
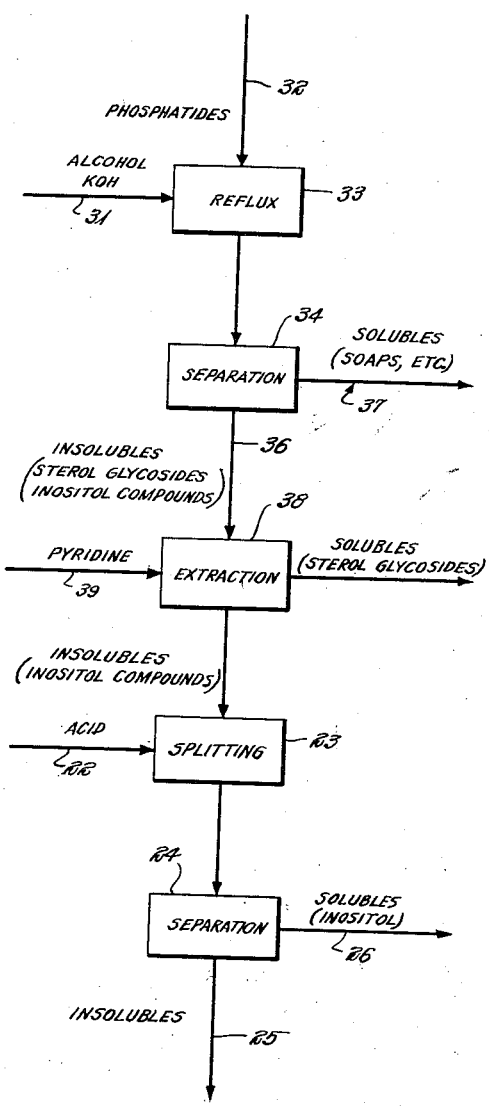
INVENTOR
David Perlman
Morris Mattikow
BY Harris, Kiech, Foster & Harris
ATTORNEYS Patented Oct. 5, 1954

2,691,011

UNITED STATES PATENT OFFICE 2,691,011

RECOVERY OF STEROL GLYCOSIDES AND INOSITOL

David Perlman and Morris Mattikow, New York, N. Y., assignors to Benjamin Clayton, doing business under the fictitious name and style of Refining, Unincorporated Application October 26, 1950, Serial No. 192,232

12 Claims. (Cl. 260—210.5)

This invention relates to the recovery of sterol glycosides and inositol, and more particularly, to the recovery of such materials from phosphatidic material obtained from vegetable oils.

Crude vegetable oils, such as cottonseed oil, corn oil, soyabean oil, peanut oil, linseed oil, rape seed oil, etc., usually contain substantial amounts of phosphatidic material. This is true regardless of whether the oil is recovered from the oil seeds by pressing operations or solvent extraction operations. Such phosphatidic material can be recovered from the crude oil by adding a small amount of water to the oil to precipitate the phosphatidic material therein and then continuously centrifugally separating the precipitated material from the oil. This process is carried out commercially on a large scale for recovering phosphatidic material from corn oil and soyabean oil as part of the refining procedure for such oils. The recovered phosphatidic material is dried by evaporation of water under vacuum and at moderate temperatures. The dried phosphatidic materials are sold commercially and contain an amount of the original oil ranging between approximately 30 and 40% of the crude phosphatides.

The phosphatidic material recovered from soyabean oil and corn oil is largely used in edible products and is relatively inexpensive since it is a by-product and the amount which can be recovered considerably exceeds the demand. Phosphatidic material from certain other edible oils, such as peanut oil, is suitable for the same purposes but, so far as applicants are aware, it is not produced commercially. The phosphatidic material from cottonseed oil is, in general, not suitable for edible purposes as it contains a difficultly removable toxic material, gossypol, and such material as well as the phosphatidic materials from other edible vegetable oils and from non-edible vegetable oils such as those employed in paints are discarded as waste materials from the oils in the various refining procedures employed thereon.

The phosphatidic materials which can be recovered from cottonseed oil and the non-edible oils as well as the surplus phosphatidic materials which can be recovered from other edible oils are suitable for employment in the present invention. That is to say, the phosphatidic materials which can be obtained from any of the above oils constitute an excellent source for the recovery of sterol glycosides. Such phosphatidic material will usually contain between 4% and 10% of sterol glycosides based on the weight of the oil-free phosphatidic material. The sterol glycosides are apparently present in the phosphatidic material as part of complex compounds with the phosphatides since breaking up of the phosphatidic molecules appears to be necessary for the separation of the sterol glycosides from the phosphatidic material. In accordance with the present invention, we have discovered that high yields of sterol glycosides in substantially pure form may be recovered from vegetable oil phosphatidic material by an alkaline process in which the materials being treated are at all times maintained either alkaline or substantially neutral such that elaborate and expensive apparatus resistant to corrosion by acids is not required.

The phosphatidic material will also usually contain a small amount of inositol-containing compounds commonly referred to as inositides. The initial step in the alkaline process of recovering sterol glycosides also liberates the inositides and the liberated inositides are readily separated from the sterol glycosides. The inositides can then be split by acid treatment to liberate inositol and substantially pure inositol thereby recovered from the split products. The inositides, however, represent a very small part of the original starting material so that the present process avoids the employment of large scale acid resistant apparatus.

The starting material for the present process may be either the crude phosphatidic material referred to above after such material has been dried to remove substantially all water or the starting material may be such dried phosphatidic material from which the carrier oil has been removed by solvent treatment. That is to say, substantially all of the sterol glycosides and inositides remain in the phosphatidic material even though the carrier oil has been removed therefrom by treatment of the crude phosphatidic material with an organic solvent for the oil which is not a solvent for the phosphatides. Also, the starting material may be the alcohol-insoluble fraction of oil-free vegetable oil phosphatides as such alcohol-insoluble fraction contains sterol glycosides and the major proportion of the inositides. The alcohol-soluble fraction of oil-free phosphatides contains some sterol glycosides and a minor proportion of the inositides but is not as rich a source of these products as the alcohol-insoluble fraction of oil-free phosphatides.

The present process provides for the recovery of both sterol glycosides and inositol from an inexpensive source material by a relatively simple procedure. Both of these products have many possible uses in the arts but have not been available for general use principally because of their high cost. Both products have pharmaceutical uses, inositol being one of the B complex vitamins.

It is therefore an object of the present invention to provide a process of recovering sterol glycosides from phosphatidic material.

Another object of the present invention is to provide a process of recovering sterol glycosides from phosphatidic material, in which the materials being treated are maintained alkaline or substantially neutral particularly during the initial treatment in which large quantities of materials are involved.

Another object of the invention is to provide a process of recovering sterol glycosides from phosphatidic material in which inositides are also liberated and can thereafter be recovered and treated to recover inositol.

A further object of the invention is to provide a process of recovering inositides or inositol from phosphatidic material.

A still further object of the invention is to provide a process of recovering both sterol glycosides and inositol from phosphatidic material in which inositides obtained during the recovery of sterol glycosides is treated to recover inositol therefrom.

Other objects and advantages of the invention will appear in the following detailed description of the process.

In carrying out the process of the present invention, either dried crude phosphatidic material or oil-free phosphatidic material containing carrier oil is first treated to decompose the phosphatides with caustic alkali in a lower aliphatic monohydric alcohol alone or in a solvent mixture containing both an alcohol and an organic nitrogenous base in which inositides are soluble. The caustic alkali decomposes the phosphatides and combines with any free fatty acids originally present or any fatty acids liberated from the phosphatide molecule to form soap. Any glycerine forming part of either the oil molecules or phosphatide molecules is also liberated, but more importantly, both the sterol glycosides and inositides are liberated from the phosphatidic complex by the treatment of the phosphatidic material with caustic alkali in the presence of the lower aliphatic monohydric alcohol.

Both the sterol glycosides and inositides are substantially insoluble in the alcohol or in an alkali-alcohol solution, while the other products present in the mixture after decomposition of the phosphatides are relatively soluble in the alcohol or alkali-alcohol solution. This enables such other products to be readily separated from either the sterol glycosides or inositides or both. The sterol glycosides are, however, quite soluble in organic nitrogenous bases while the inositides are relatively insoluble therein, thereby enabling such bases to be employed to effect a separation between the sterol glycosides and the inositides. The amount of alcohol in an original alkali-solvent mixture containing an organic nitrogenous base may, however, be sufficiently small that the other products referred to also remain insoluble along with the inositides, thus enabling immediate separation of the soluble sterol glycosides. After the inositides have been separated from the sterol glycosides and preferably also from the other products referred to above, they can be split by an acid treatment employing an aqueous solution of a strong acid to liberate the inositol. The inositol is relatively soluble in the acid solution or water whereas the majority of the other products of the reaction are relatively insoluble. Inositol may therefore be readily recovered from the reaction products resulting from the splitting treatment.

The preferred process of the present invention is to employ an initial reaction mixture containing a relatively large proportion of pyridine, a smaller proportion of alcohol and a moderate excess of caustic alkali such as potassium hydroxide. This process is illustrated diagrammatically in Fig. 1 in which 10 indicates the initial splitting step. The phosphatidic material, a lower aliphatic monohydric alcohol and pyridine may be admixed at room temperature in any suitable container, the addition of phosphatides being indicated by the arrow 11 and the addition of alcohol, alkali and pyridine being indicated by the arrow 12. The amount of alcohol will usually range between approximately 1 and 3 times the volume of phosphatides and the amount of pyridine will usually range between approximately 5 and 20 times the volume of the phosphatides. This admixture is allowed to stand at room temperature for a substantial period of time, usually ranging between 12 and 48 hours. At the end of this time the phosphatides and any oil present have been decomposed and substantially all of the sterol glycosides are in solution, the other materials such as inositides, soaps, etc., remaining insoluble. The solution containing the sterol glycosides may be separated from the insoluble materials as indicated at 13, the removal of the sterol glycoside solution being indicated by the arrow 14. Since some of the sterol glycosides remain in the liquid adhering to the insoluble materials, it is preferable to wash the residue several times with pyridine and combine these extracts with the solution originally removed from the residue. Upon distilling the pyridine and alcohol from the combined extracts in vacuo, a material high in sterol glycoside content is recovered. This material may be further purified by being again dissolved in pyridine, filtering and evaporating to dryness in vacuo.

The insolubles, indicated by the arrow 16, contain the inositol compounds, and various impurities including soap, etc. By washing the residue of insolubles with a lower aliphatic monohydric alcohol, as indicated at 17, most of the impurities including soaps, etc., are removed, the addition of alcohol being indicated by the arrow 18 and the removal of the alcohol solution of impurities being indicated by the arrow 19. The washing operation can be carried out using alcohol at room temperature or, if desired, somewhat lesser amounts of alcohol at elevated temperatures below the boiling point of the alcohol may be employed. The preferred procedure is to wash four or five times with 5 to 20 volumes of alcohol at room temperature. The inositol compounds remain insoluble in the alcohol and may be delivered to a splitting step as indicated by the arrow 21. An aqueous solution of strong acid may be added thereto as indicated by the arrow 22 and heated under reflux for a considerable period of time, this time usually ranging from approximately 9 to 36 hours. The amount of acid solution employed will usually range from approximately 7 to 30 times the volume of inositol compounds and the concentration of the acid solution may vary considerably depending upon the acid employed. Concentrations up to 20% hydrochloric acid (constant boiling) have been successfully used but considerably lower concentrations can be employed. Solutions of other strong acids such as sulfuric acid can also be employed having comparable normalities to those of such hydrochloric acid solutions. The split products from the splitting step 23 may then be separated as indicated at 24. The inositol is soluble in water and in the acid solution while the other materials present are relatively insoluble and may be separated from the inositol-acid solution in any desired manner, such as by filtration. This insoluble material is preferably washed several times with water and the washings combined with the solution originally separated from the insoluble material. The insolubles indicated at 25 may be discharged from the process and the solubles indicated at 26 recovered from the acid solution.

The acid employed is preferably a volatile acid such as hydrochloric acid and upon evaporation of the water and acid, a residue containing a relatively high concentration of inositol is obtained. This residue may be further purified by triturating it with a lower aliphatic monohydric alcohol and filtering. The insoluble material may then be washed with further alcohol and dried to yield substantially pure inositol. If a relatively non-volatile acid, such as sulfuric or phosphoric acid is employed, the solution containing inositol may be concentrated, preferably after neutralization of the acid, and the inositol precipitated by adding a lower aliphatic monohydric alcohol. The neutralization may, for example, be with barium hydroxide until the solution is alkaline to phenolphthalein. The precipitate of barium sulphate, barium phosphate and other insoluble salts may be filtered from the solution and the filtrate evaporated to dryness in vacuo before triturating with alcohol.

The method of obtaining both sterol glycosides and inositol illustrated in Fig. 2 can also be employed. In accordance with this figure, alcoholic potassium hydroxide, as indicated by the arrow 31, is added to phosphatidic material as indicated by the arrow 32, and the resulting mixture refluxed for a considerable period of time, as indicated at 33. The amount of alcohol employed may range from approximately 4 to 12 volumes per volume of phosphatides and the amount of potassium hydroxide may range from approximately the saponification number of the phosphatides to two times the amount of phosphatides by weight. The time for reflux may vary, for example, from 4 to 16 hours. The insoluble material may be separated from the alcoholic potassium hydroxide solution, as indicated at 34. Thus the insoluble materials indicated by the arrow 36, which are largely sterol glycosides and inositides, may be filtered from the solution, the solution containing soaps, excess potassium hydroxide, etc. The solubles indicated by the arrow 37 may be discharged from the process. The insolubles are preferably washed several times with alcohol and the washed precipitates dried.

The washed precipitate may then be extracted with pyridine as indicated at 38, pyridine being added to the washed insolubles as indicated by the arrow 39. The extraction is preferably carried on at a temperature between 90° and 100° C., employing an amount of pyridine ranging from approximately 4 to 10 times the volume of the original phosphatides. The supernatant liquid may be removed and the extraction repeated several times, preferably with a lesser amount of pyridine. The combined extracts may be distilled in vacuo at approximately 95° C. to remove the pyridine and a fine white powder which is essentially pure sterol glycosides is obtained.

The insolubles from the extraction step 38 are essentially inositides and they may be treated in a splitting step 23 of the type described above with respect to Fig. 1, and separated as indicated at 24 to recover substantially pure inositol. Instead of employing pyridine to extract the sterol glycosides from the insolubles, the latter may be treated with mineral acid to dissolve the inositides and leave the sterol glycosides. The acid solubles may be worked to obtain the inositol compounds. Also if it is not desired to recover the sterol glycosides, the entire insolubles from the separation step 34 of Fig. 2 can be subjected to the inositide splitting step 23 and extraction step 24 to recover substantially pure inositol without a prior separation between the inositides and sterol glycosides.

*Example 1*

As a specific example of recovering sterol glycosides and inositides in accordance with the process of Fig. 1, 10 parts by weight of oil-free corn oil phosphatides, 3 parts by weight of potassium hydroxide, approximately two volumes of methanol based on the volume of the phosphatides and approximately 10 volumes of pyridine based on the volume of the phosphatides was allowed to stand 24 hours at room temperature. The supernatant liquid was taken off and the residue extracted four times employing approximately 4 volumes of pyridine based on the original volume of the phosphatides in each extraction step. In each case the supernatant liquid was decanted from the residue. The original supernatant liquid and the various extracts were combined and the pyridine as well as the small amount of alcohol originally added was distilled in vacuo and a residue of approximately 0.85 parts by weight was obtained. This residue was taken up in approximately 10 times its volume of pyridine. The resulting solution was filtered to remove insoluble matter and then the pyridine removed from the filtrate in vacuo leaving a residue of 0.75 parts by weight of substantially pure sterol glycosides, the product being a white powder having a melting point of 300° C. with decomposition.

The residue from the original separation, following the treatment of the phosphatides in the alcohol, potassium hydroxide and pyridine, was washed several times with methanol employing about 10 volumes of methanol based on the volume of the residue and the soluble materials discarded after the alcohol has been distilled therefrom for re-use in the process. The washed residue was relatively pure inositides.

*Example 2*

As an example of recovering substantially pure sterol glycosides and inositides from phosphatides in accordance with the process of Fig. 2, 567 parts by weight of oil-free corn oil phosphatides, 567 parts by weight of potassium hydroxide and an amount of methanol equal to approximately 6 times by volume of the phosphatides was refluxed for 8 hours. The mixture was filtered hot and the precipitate washed five times with approximately 1 volume of methanol based on the original volume of the phosphatides. The washed precipitate was dried in a vacuum oven at 25° C. and a yield of 147 parts by weight of a fine very light yellow powder was obtained. To separate this material into sterol glycosides and inositides, 200 parts by weight of the yellow powder were extracted at a temperature of approximately 95° C. with approximately 6 volumes of pyridine based on the original volume of the phosphatides. The mixture was stirred mechanically for several hours and the mixture allowed to settle. The clear supernatant residue was syphoned off and the residue again extracted with approximately 3 volumes of pyridine based on the original volume of the phosphatides and the latter extraction repeated five times. The extracts were combined and the pyridine distilled in vacuo in a boiling water bath. A yield of 30 parts by weight of a fine white powder was obtained having a melting point of 305° C. with decomposition and was substantially pure sterol glycosides. The insoluble residue from the extraction was substantially pure inositides.

*Example 3*

As a specific example of recovering purified inositol, 10 parts by weight of the alcohol-washed pyridine-insoluble material from Example 2 were added to approximately 15 times their volume of a mixture made up of 1 part by volume of concentrated hydrochloric acid and 1 part by volume of water. The mixture was refluxed for 18 hours, cooled and filtered. The insoluble material was washed several times with water at room temperature and the washings combined with the filtrate. The water was evaporated from the combined filtrate and wash waters at atmospheric pressure and the final portion of water distilled in vacuo. The residue was triturated with methyl alcohol and filtered and the resulting residue was washed with methyl alcohol and dried. The yield was 3.8 parts by weight of a light grey powder which was high in inositol.

To ascertain how much inositol was present in this residue, 1 gr. of the powder was treated with 10 ml. of a mixture of 9.5 ml. of acetic anyhydride and 0.5 ml. of concentrated sulfuric acid. The reaction mixture was stirred 5 minutes at room temperature and 10 minutes in a boiling water bath and the mixture poured into water containing ice. A white precipitate, hexa acetyl inositol immediately formed and was filtered from the solution and dried. The yield was 0.84 grams of a powder that melted at 216° C., the melting point of pure hexa acetyl inositol, as reported in the literature, being in the range of 212 to 218° C. There was no depression of the melting point when the hexa acetyl inositol from the process was mixed with an authentic sample of pure hexa acetyl inositol.

While methyl alcohol is the preferred alcohol employed in all of the various steps above referred to, any of the normal lower aliphatic monohydric alcohols having not more than five carbon atoms may be employed throughout the process. Thus the reflux temperature in the phosphatide splitting step of Fig. 2 may range from approximately 64° to 150° C. Also, pyridine has been referred to as the solvent for sterol glycosides in which inositol-containing compounds are insoluble but it is entirely possible to employ other vaporizable organic nitrogenous bases including the aliphatic amines such as tertiary amines, for example, triethylamine and also picolines, lutidines and certain tar base fractions which will dissolve sterol glycosides but which will not dissolve inositides. Furthermore, potassium hydroxide has been referred to as the caustic alkali employed, but again, it is possible to substitute other alkali metal hydroxides such as sodium hydroxide.

The nature of the sterol glycosides recovered will depend upon the original source of the phosphatidic material. Thus, in the case of corn oil, the sterol glycosides will be largely alpha, beta and gamma sitosterols although some sitostanol and stigmasterol are present. Other sterol glycosides are recovered from vegetable phosphatides from other vegetable oils. The components of the inositides are inositol, phosphoric acid, non-reducing carbohydrate and a metal such as magnesium, calcium and potassium. Instead of carrying the inositide splitting step sufficiently far to liberate free inositol, this step may be controlled to partially split the inositides, for example, to remove the metal and carbohydrate components and enable the recovery of inositol mono or diphosphoric acid. Although relatively large amounts of solvents such as alcohols or organic bases are used in the process, these solvents are or may be recovered for re-use.

When referring to the volume of phosphatides, it is the actual volume of the oil-free phosphatides which is referred to. That is to say, phosphatidic material containing carrier oil may be in the form of a viscous liquid or semi-solid and oil-free phosphatidic material may be in the form of a wax, solid or a powder. The powder may have a relatively low apparent density, i. e., a relatively high apparent volume, but as stated, it is the actual rather than the apparent volume which is referred to.

This application is a continuation-in-part of our copending application Serial No. 120,601, filed October 10, 1949, now abandoned.

We claim:

1. The process of recovering sterol glycosides and inositol from vegetable oil phosphatidic material, which comprises, treating said material with a caustic alkali in the presence of a lower aliphatic alcohol containing not more than 5 carbon atoms to liberate sterol glycosides and inositides, adding pyridine to the materials in said process to dissolve the sterol glycosides without dissolving said inositides, separating the resulting solution containing the dissolved sterol glycosides from the inositides and recovering substantially pure sterol glycosides therefrom, treating the separated inositides with an aqueous solution of a strong mineral acid, whereby inositol is liberated and dissolves in the resulting solution, and recovering substantially pure inositol from the last-mentioned solution.

2. The process as defined in claim 1, in which the amount of alcohol employed during treating of said phosphatidic material with caustic alkali is between approximately 4 and 12 volumes per volume of said material, the temperature is the reflux temperature of the alcohol and the sterol glycosides and inositides are separated as insoluble materials from the resulting heated solution.

3. The process as defined in claim 1, in which the amount of alcohol employed during said treating of said phosphatidic material with said caustic alkali is between approximately 1 to 3 volumes per volume of phosphatidic material and pyridine is also present in an amount between approximately 5 and 20 volumes per volume of phosphatidic material, the temperature being approximately room temperature and the sterol glycosides are separated as solubles from the resulting solution, leaving the inositides as insolubles.

4. The process of recovering sterol glycosides from vegetable oil phosphatidic material, which comprises, treating said material with an excess of caustic alkali in a lower aliphatic alcohol containing not more than 5 carbon atoms and at a temperature between approximately 64° and 150° C. for sufficient time to liberate the sterol glycosides, said sterol glycosides being insoluble in the resulting alcoholic-alkali solution, separating the insoluble material from said solution and recovering sterol glycosides therefrom.

5. The process of recovering sterol glycosides from vegetable oil phosphatidic material, which comprises, treating said material with an amount of a caustic alkali between approximately the saponification number of said material and 2 times the weight of said material in a lower aliphatic alcohol containing not more than 5 carbon atoms and at a temperature between approximately 64° and 150° C. for sufficient time to liberate the sterol glycosides, said sterol glycosides being insoluble in the resulting alcoholic-alkali solution, separating the insoluble material from said solution and recovering sterol glycosides therefrom.

6. The process of recovering sterol glycosides from vegetable oil phosphatidic material, which comprises, treating said material with an excess of a caustic alkali in a lower aliphatic alcohol containing not more than 5 carbon atoms and at a temperature between approximately 64° and 150° C. for sufficient time to liberate the sterol glycosides, the amount of alcohol being between approximately 4 and 12 times the volume of said material, said sterol glycosides being insoluble in the resulting alcoholic-alkali solution, separating the insoluble material from said solution and recovering sterol glycosides therefrom.

7. The process of recovering sterol glycosides from vegetable oil phosphatidic material, which comprises, treating said material with an amount of a caustic alkali between approximately the saponification number of said material and 2 times the weight of said material in a lower aliphatic alcohol containing not more than 5 carbon atoms and at a temperature between approximately 64° and 150° C. for sufficient time to liberate the sterol glycosides, said sterol glycosides being insoluble in the resulting alcoholic-alkali solution, separating the insoluble material from said solution and recovering sterol glycosides therefrom.

8. The process of recovering sterol glycosides from vegetable oil phosphatidic material, which comprises, treating said material with a caustic alkali in the presence of a lower aliphatic alcohol containing not more than 5 carbon atoms to liberate sterol glycosides and inositides, adding pyridine to the materials in said process to dissolve the sterol glycosides without dissolving said inositides, separating the resulting solution containing the dissolved sterol glycosides from the inositides and recovering sterol glycosides therefrom.

9. The process as defined in claim 8, in which the vegetable oil phosphatidic material is the alcohol-insoluble fraction of oil-free vegetable oil phosphatides, and inositides are recovered from the materials insoluble in said resulting solution.

10. The process of recovering sterol glycosides from vegetable oil phosphatidic material, which comprises, treating said material with a caustic alkali in the presence of a lower aliphatic alcohol containing not more than 5 carbon atoms to liberate sterol glycosides and inositides, adding a volatile liquid organic nitrogenous base which will dissolve said sterol glycosides and not dissolve said inositides to the materials in said process for dissolving said sterol glycosides without dissolving said inositides to obtain a resulting solution containing sterol glycosides dissolved in said organic base, separating the resulting solution containing the dissolved sterol glycosides from the inositides and recovering sterol glycosides therefrom.

11. The process as defined in claim 10, which includes the step of recovering inositides from the material insoluble in said solution.

12. The process as defined in claim 11, which includes the steps of treating the recovered inositides with an aqueous solution of a strong mineral acid to liberate inositol soluble in the resulting solution, and recovering inositol from the last-mentioned solution.

References Cited in the file of this patent

UNITED STATES PATENTS

| Number | Name | Date |
|---|---|---|
| 2,306,547 | Langlois | Dec. 29, 1942 |
| 2,415,301 | Mattikow | Feb. 4, 1947 |
| 2,415,313 | Thurman | Feb. 4, 1947 |